United States Patent
Venkatanarayanan et al.

(10) Patent No.: US 12,222,819 B2
(45) Date of Patent: Feb. 11, 2025

(54) DATA PROTECTION FOR STUB FILES AND CLOUD METADATA

(71) Applicant: Dell Products L.P., Round Rock, TX (US)

(72) Inventors: Prakash Venkatanarayanan, Framingham, MA (US); Upanshu Singhal, Bangalore (IN); Anurag Bhatnagar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 122 days.

(21) Appl. No.: 17/866,856

(22) Filed: Jul. 18, 2022

(65) Prior Publication Data

US 2024/0020205 A1 Jan. 18, 2024

(51) Int. Cl.
*G06F 7/02* (2006.01)
*G06F 11/14* (2006.01)
*G06F 16/00* (2019.01)
*G06F 16/10* (2019.01)
*G06F 16/11* (2019.01)

(52) U.S. Cl.
CPC ...... *G06F 11/1464* (2013.01); *G06F 11/1469* (2013.01); *G06F 16/10* (2019.01); *G06F 16/113* (2019.01); *G06F 2201/84* (2013.01)

(58) Field of Classification Search
CPC .... G06F 11/1464; G06F 16/10; G06F 16/113; G06F 11/1469; G06F 2201/84
See application file for complete search history.

(56) References Cited

U.S. PATENT DOCUMENTS

| | | | |
|---|---|---|---|
| 9,852,149 B1 * | 12/2017 | Taylor | G06F 16/1844 |
| 11,023,433 B1 * | 6/2021 | Datta | G06F 16/219 |
| 11,449,388 B1 * | 9/2022 | Hoffman | G06F 3/0683 |
| 2023/0058908 A1 * | 2/2023 | Shaw | G06F 16/119 |

OTHER PUBLICATIONS

Wikipedia, "Mount (Unix)" https://en.wikipedia.org/w/index.php?title=Mount_(Unix)&oldid=1096576955, Jul. 5, 2022, 4 pages.
Dell Technologies, "PowerProtect Data Manager," https://www.dell.com/en-us/dt/data-protection/powerprotect-data-manager.htm, Accessed Jul. 11, 2022, 15 pages.
E. Sullivan et al., "File System," https://www.techtarget.com/searchstorage/definition/file-system, Accessed Jul. 12, 2022, 5 pages.
Dell Technologies, "Cloud Mobility for Dell EMC PowerMax," White Paper, H18510.2, Jan. 2022, 32 pages.

* cited by examiner

*Primary Examiner* — Bruce M Moser
(74) *Attorney, Agent, or Firm* — Ryan, Mason & Lewis, LLP

(57) ABSTRACT

A method comprises requesting and receiving from a cloud mobility platform metadata for accessing one or more file systems which have been tiered to cloud storage, and writing the metadata to at least one backup storage location. In the method, a plurality of stub files are read, the plurality of stub files corresponding to a plurality of files of the one or more file systems which have been tiered to cloud storage. The plurality of stub files are written to the at least one backup storage location.

20 Claims, 7 Drawing Sheets

DATA PROTECTION FOR STUB FILES AND CLOUD METADATA

FIELD

The field relates generally to information processing systems, and more particularly to storage in information processing systems.

BACKGROUND

In data storage, files that are frequently used and/or critical are generally stored in local storage for fast access. Files that are less frequently used and that do not require the same level of access as the files in local storage can be archived and stored in, for example, low-cost object and cloud storage tiers. Cloud tiering solutions archive infrequently accessed data to lower cost cloud storage, leaving behind low capacity (e.g., 8 KB, 10 KB) stub files in local storage (e.g., storage arrays). The stub files include, for example, information about the corresponding archived file in cloud storage, allowing for rehydration (restoring) of the archived file back to local storage on demand. This provides users with reduced operational cost along with on demand access to files.

SUMMARY

Illustrative embodiments provide techniques for identifying and backing up stub files and cloud storage metadata in connection with data protection.

In one embodiment, a method comprises requesting and receiving from a cloud mobility platform metadata for accessing one or more file systems which have been tiered to cloud storage, and writing the metadata to at least one backup storage location. In the method, a plurality of stub files are read, the plurality of stub files corresponding to a plurality of files of the one or more file systems which have been tiered to cloud storage. The plurality of stub files are written to the at least one backup storage location.

These and other illustrative embodiments include, without limitation, methods, apparatus, networks, systems and processor-readable storage media.

DETAILED DESCRIPTION

Figure 1:
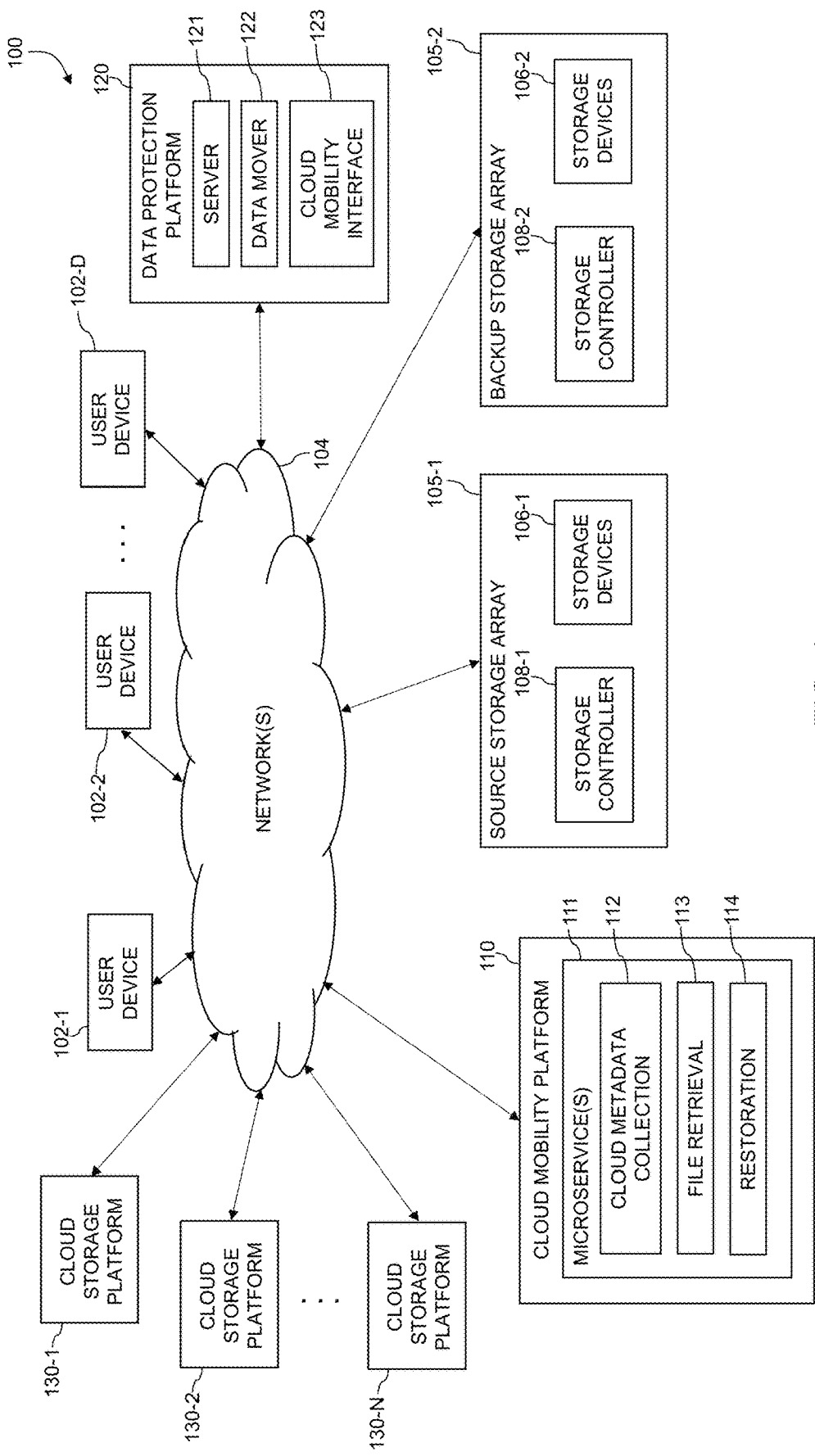
FIG. 1 depicts details of an information processing system for implementing identification and backing up of stub files and cloud storage metadata according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "stub file" refers to a file placed in an original file location on a storage device when the original file is archived to an archive location, such as, for example, a cloud storage platform. According to an embodiment, when a stub file is read in an input-output (TO) operation, the IO operation is passed through to the original file located in the archive location, and the original file may be presented to a user as if the original file were in its original location on the storage device. The stub file occupies less memory space ("size on disk") than the original file.

As used herein, "microservice" or "microservices" refers to collections of loosely coupled, fine-grained and parallelized services implementing lightweight protocols. Microservices can refer to a suite of small services for an application, with each microservice executing its own process and communicating with lightweight mechanisms that use relatively small amounts of computer resources.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

Illustrative embodiments provide techniques for data protection where, during backup processes, stub files are backed up to secondary storage without rehydration of their corresponding archived files from cloud storage. Additionally, required cloud metadata, including details like encryption keys and access credentials, is backed up to secondary storage to enable future rehydration of the archived files. Advantageously, rehydration is avoided during the backup process, but can be performed in future processes since the backup includes the required cloud metadata if restoration of entire files needs to be performed.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a cloud mobility platform 110 and a data protection platform 120. The user devices 102 may also communicate over the network 104 with a source storage array 105-1 and a backup storage array 105-2, collectively referred to herein as storage arrays 105. The storage arrays 105 comprise respective sets of storage devices 106-1 and 106-2, collectively referred to herein as storage devices 106, coupled to respective storage controllers 108-1 and 108-2, collectively referred to herein as storage controllers 108.

A non-limiting example of a cloud mobility platform 110 comprises a cloud tiering appliance (CTA), but the embodiments are not necessarily limited thereto, and the cloud mobility platform 110 may comprise another platform or system for moving data from one or more source storage locations to one or more cloud storage environments. In some embodiments, the cloud mobility platform 110 is configured within an embedded guest running on a hypervisor of an operating system of a storage array (e.g., source storage array 105-1). In a non-limiting example embodiment, a single dedicated 4-port 10 Gb Ethernet input-output (IO) module is connected to the embedded guest to provide external Internet Protocol (IP) connectivity to the cloud providers (e.g., cloud storage platforms). These ports can be configured as individual ports or as teams to provide resiliency.

The user devices 102 can comprise, for example, Internet of Things (IoT) devices, desktop, laptop or tablet computers, mobile telephones, or other types of processing devices capable of communicating with the cloud mobility platform 110, data protection platform 120 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, N and P are assumed to be arbitrary positive integers greater than or equal to one.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the cloud mobility platform 110 and/or the data protection platform 120 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cloud mobility platform 110 and/or the data protection platform 120, as well as to support communication between the cloud mobility platform 110, the data protection platform 120 and connected devices (e.g., user devices 102) and/or other related systems and devices not explicitly shown.

Users may refer to customers, clients and/or administrators of computing environments for which archiving and migration are being performed. For example, in some embodiments, the user devices 102 are assumed to be associated with repair technicians, system administrators, information technology (IT) managers, software developers release management personnel or other authorized personnel configured to access and utilize the cloud mobility platform 110.

The cloud mobility platform 110 of the system 100 is configured to move data between the storage arrays 105 and one or more cloud storage platforms 130-1, 130-2, . . . 130-N, collectively referred to herein as cloud storage platforms 130. The cloud mobility platform 110 is also configured to move data from one or more of the user devices 102 to one or more cloud storage platforms 130. The data protection platform 120 is configured to move data from one of the storage arrays 105 to another one of the storage arrays 105 (e.g., between source storage array 105-1 and backup storage array 105-2). In illustrative embodiments, the data protection platform 120 provides software defined data protection (e.g., data backup and restore capabilities). The data protection platform 120 is configured to protect, manage and recover data in on-premises, virtualized and cloud deployments.

The cloud mobility platform 110 and/or the data protection platform 120 are configured to move data, for example, by moving data files, snapshots or other data objects in and between the user devices 102, the storage arrays 105 and/or the cloud storage platforms 130. A given data object may comprise a single data file, or multiple data files. According to one or more embodiments, the cloud mobility platform 110 and/or the data protection platform 120 permits administrators to automatically move data in and between the user devices 102, the storage arrays 105 and the cloud storage platforms 130 based on user-configured policies. The data protection platform 120 includes, for example, Dell ° PowerProtect Data Manager or other data protection infrastructure. The cloud storage platforms 130 include, for example, Dell ° Elastic Cloud Storage (ECS), Microsoft® Azure®, Amazon ° S3, Google ° and/or IBM ° Cloud Object Storage (COS) platforms, or other available cloud infrastructures.

The cloud mobility platform 110 and/or the data protection platform 120 in the present embodiment are assumed to be accessible to the user devices 102, and vice-versa, over the network 104. In addition, the cloud mobility platform 110, the data protection platform 120 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The data protection platform 120, in conjunction with the cloud mobility platform 110, on behalf of respective infrastructure tenants each corresponding to one or more users associated with respective ones of the user devices 102 implements identification and backing up of stub files and cloud storage metadata. Referring to FIG. 1, the cloud mobility platform 110 comprises a microservice(s) component 111 comprising a cloud metadata collection layer 112, a file retrieval layer 113 and a restoration layer 114. The data protection platform 120 comprises a server 121, a data mover 122 and a cloud mobility interface 123.

The data mover 122 of the data protection platform 120 is adapted to interact with, for example, the storage arrays 105. At least one configuration file is implemented in or otherwise associated with the data protection platform 120. The state of the configuration file may be controlled at least in part by a job scheduler implemented as part of the of the data protection platform 120. The job scheduler schedules backup, restoration or other tasks and communicates with the storage arrays 105 to retrieve lists of files to be backed up or restored. Tasks may start at a scheduled time that can be pre-configured or user-specified via one or more user interfaces. Similarly, although not shown, the cloud mobility platform 110 may comprise a data mover adapted to interact with the user devices 102, the storage arrays 105 and the cloud storage platforms 130. At least one configuration file is implemented in or otherwise associated with the cloud mobility platform 110. The state of the configuration file may be controlled at least in part by a job scheduler implemented as part of the cloud mobility platform 110 to schedule archiving or file tiering tasks.

The cloud mobility platform 110 and the data protection platform 120 are illustratively coupled to the network 104 and configured to control transfer of data in and between the user devices 102, the storage arrays 105 and/or the cloud storage platforms 130. The term "data movement" as used in this and other contexts herein is intended to be broadly construed, so as to encompass data migration as well as other types of movement of data and relocation in and between the user devices 102, the storage arrays 105 and/or the cloud storage platforms 130. A given data mover module can be implemented at least in part on storage arrays 105 or other storage platforms that implement at least portions of one or more storage tiers of a multi-tier storage system.

In one or more embodiments, the cloud mobility platform 110 can be used to tier file data and archive block data to the cloud storage platforms 130, and to recall file data and restore block data to the storage arrays 105 from the cloud storage platforms 130. In some embodiments, the cloud mobility platform 110 can be used to migrate repositories between cloud storage platforms 130, storage arrays 105 and/or user devices 102.

In a file tiering process (also referred to herein as "cloud tiering") or file archiving process, the cloud mobility platform 110 is configured to identify files that fit an administrator or other user-defined criteria, and the cloud mobility platform 110 initiates movement of the identified files to a cloud storage platform 130. Once an identified file is moved to a cloud storage platform 130, a stub file is created in the original file location on, for example, the source storage array 105-1. According to an embodiment, when the stub file is read, the cloud mobility platform 110 recalls or passes an IO operation through to the original file located in the cloud storage platform 130, and the original file may be presented to a user as if the original file were in its original location on the storage array 105. Stub files comprise information about destinations in the cloud storage platforms 130 where the files corresponding to the stub files are located. For example, a stub file may be generated in the source storage array 105-1 for respective ones of the files which have been tiered. The stub files comprise information (e.g., metadata) about the destinations in the cloud storage platform 130 so that the files can be retrieved when a request for access is received from, for example, a user device 102. The information may comprise, for example, server names or other identifying information (e.g., IP addresses) about the destinations in the cloud storage platform.

In conventional approaches, data protection software encounters challenges when backing up data from storage arrays such as, for example, how to detect stub files, and what to do with stub files on the storage arrays (e.g., on a primary network attached storage (NAS) server) if detected. For example, different storage arrays utilize different processes to create, tier and generate stub files, making the stub files difficult to detect. Moreover, if stub files are detected, the data protection software may need to backup data after rehydrating it back from cloud storage (e.g., perform a deep copy). Technical problems with the deep copy approach include, for example: (i) unwanted bandwidth charges from, for example, a public cloud due to the rehydration of the data; (ii) running out of space on primary storage, due to the rehydration of the data from cloud storage; and (iii) backup of a file system requiring additional time than a time allotted for a backup, leaving some data unprotected until the next scheduled backup. Additionally, in current approaches, some data protection software ignores or skips stub files, and fails to back up the stub files.

In an effort to address these problems with current approaches, illustrative embodiments provide technical solutions in which stub files are backed up without rehydration of their corresponding tiered files. In addition to the stub files, metadata required for rehydrating the corresponding tiered files is also retrieved and backed up. As a result, rehydration is avoided during backup processes, but can be performed in future processes since the backup includes the metadata needed for restoration of the corresponding tiered files. The avoidance of rehydration advantageously preserve NAS space during backup procedures.

The embodiments provide techniques where a data protection platform 120, via for example, a cloud mobility interface 123, is configured to connect to a representational state transfer (REST) API cloud mobility endpoint microservice that encapsulates different cloud tiering solutions and provides uniform structured information about storage arrays 105 and their corresponding cloud storage platforms 130. For example, referring to FIG. 1, the data protection platform 120 connects to a REST API microservice(s) component 111 of the cloud mobility platform 110 to: (i) obtain information about whether cloud tiering is enabled on a storage array (e.g., source storage array 105-1); (ii) obtain information regarding for how many and for which file systems on the storage array tiering has been enabled; (iii) request and retrieve cloud metadata for accessing the cloud storage platforms 130; and (iv) identify and retrieve (if necessary) tiered files for a given file system. Using one or more operating systems of the server 121, the data mover 122 writes the retrieved cloud metadata to a backup storage location (e.g., backup storage array 105-2). Additionally, based on the identity of the tiered files, using one or more operating systems of the server 121, the data protection platform 120 identifies and reads the stub files corresponding to the tiered files from the source storage location (e.g., source storage array 105-1). The data mover 122 writes the stub files corresponding to the tiered files to the backup storage location (e.g., backup storage array 105-2) without rehydrating the tiered files and without writing the tiered files to the backup storage location. Additionally, the data mover 122 is configured to write files that have not been tiered and/or have not been identified as being tiered from the source storage location to the backup storage location. In some embodiments, the cloud metadata and/or the stub files can be restored from the backup storage location (e.g., backup storage array 105-2) to another storage location (e.g., source storage array 105-1 or other storage system).

Figure 2:
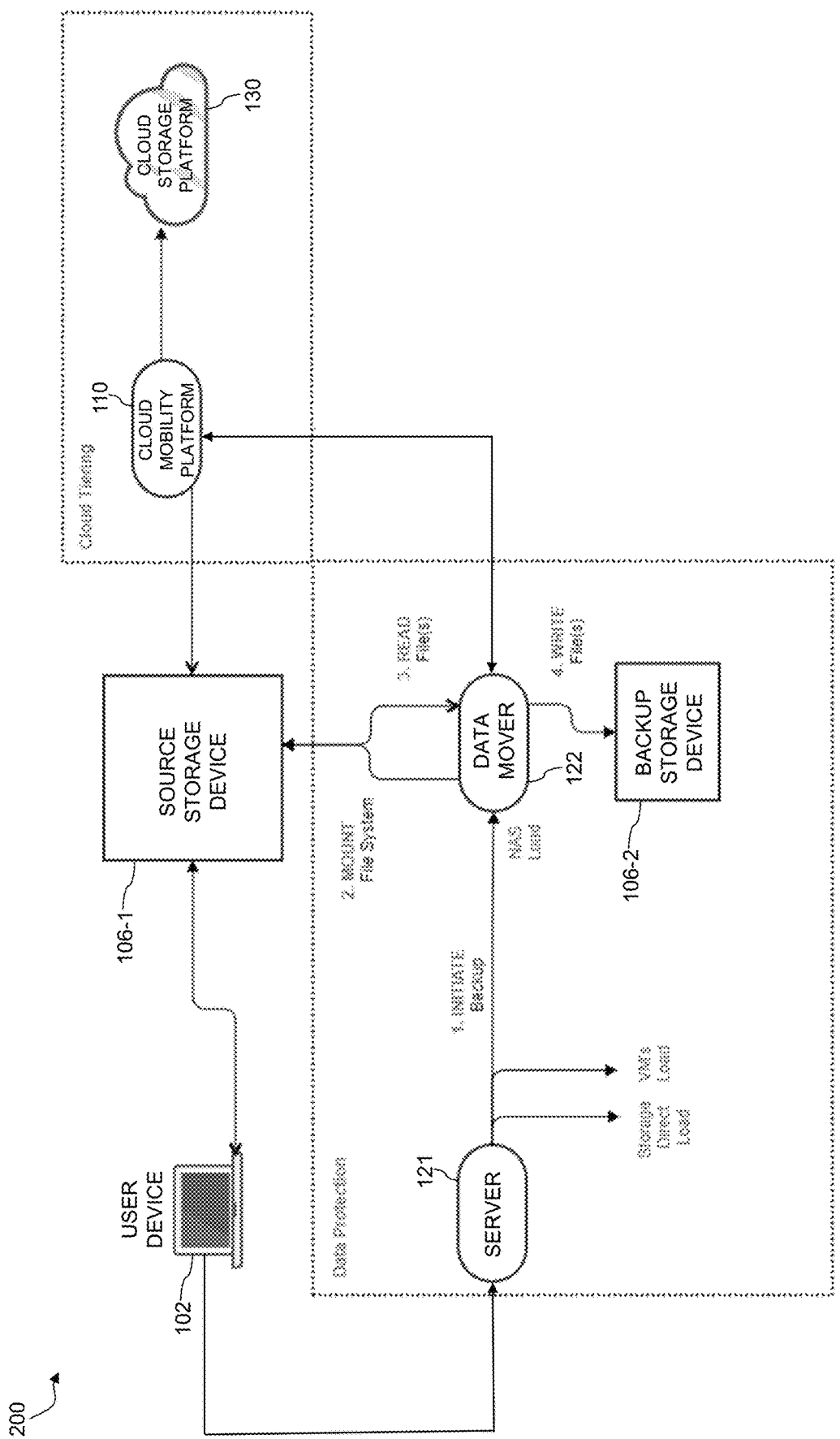
FIG. 2 depicts an operational flow for implementing identification and backing up of stub files and cloud storage metadata according to an illustrative embodiment.
Figure 3A:
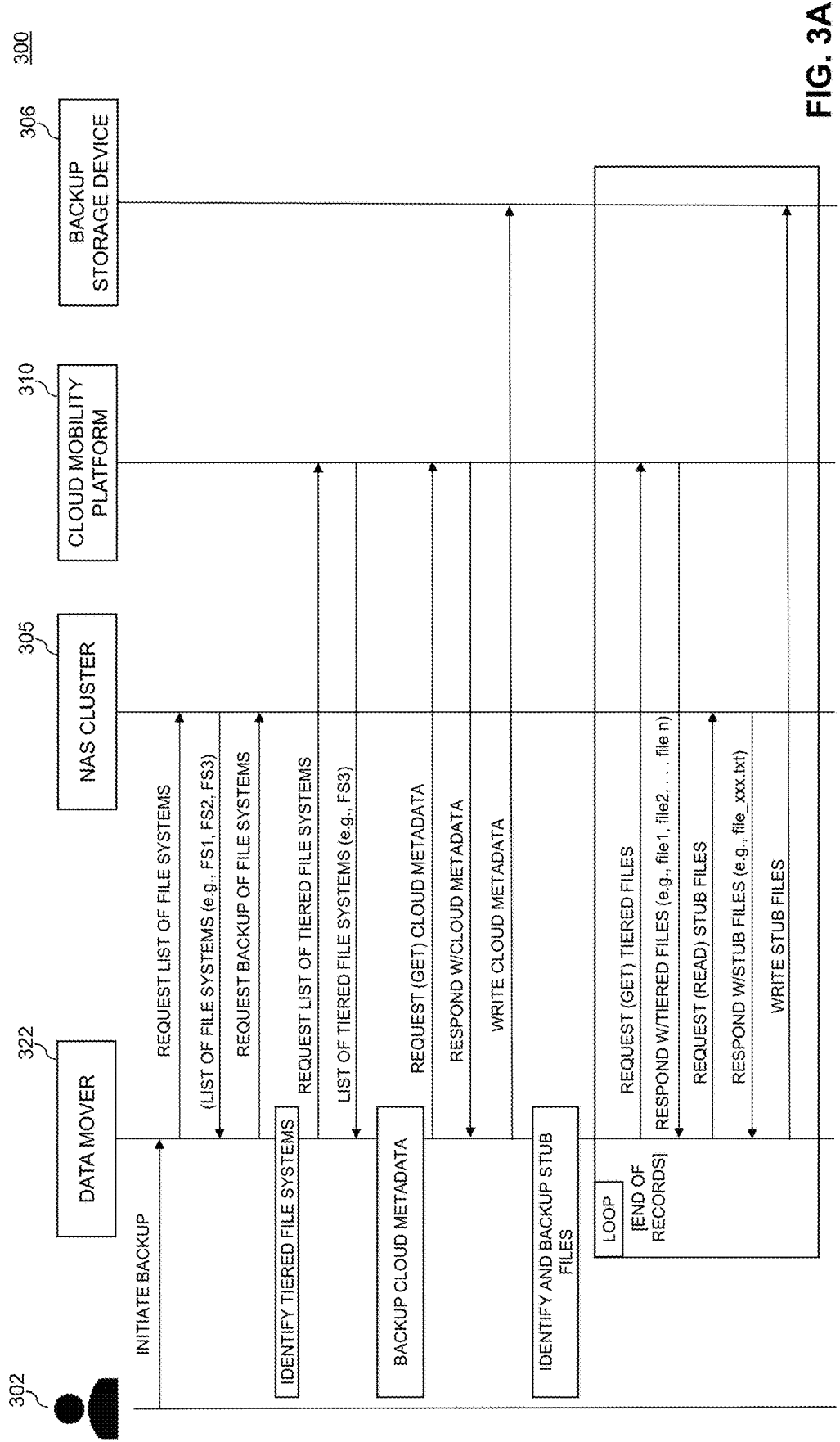
FIG. 3A depicts a first part of an operational flow diagram for data protection illustrating steps for identifying and backing up of stub files and cloud storage metadata according to an illustrative embodiment.
Figure 3B:
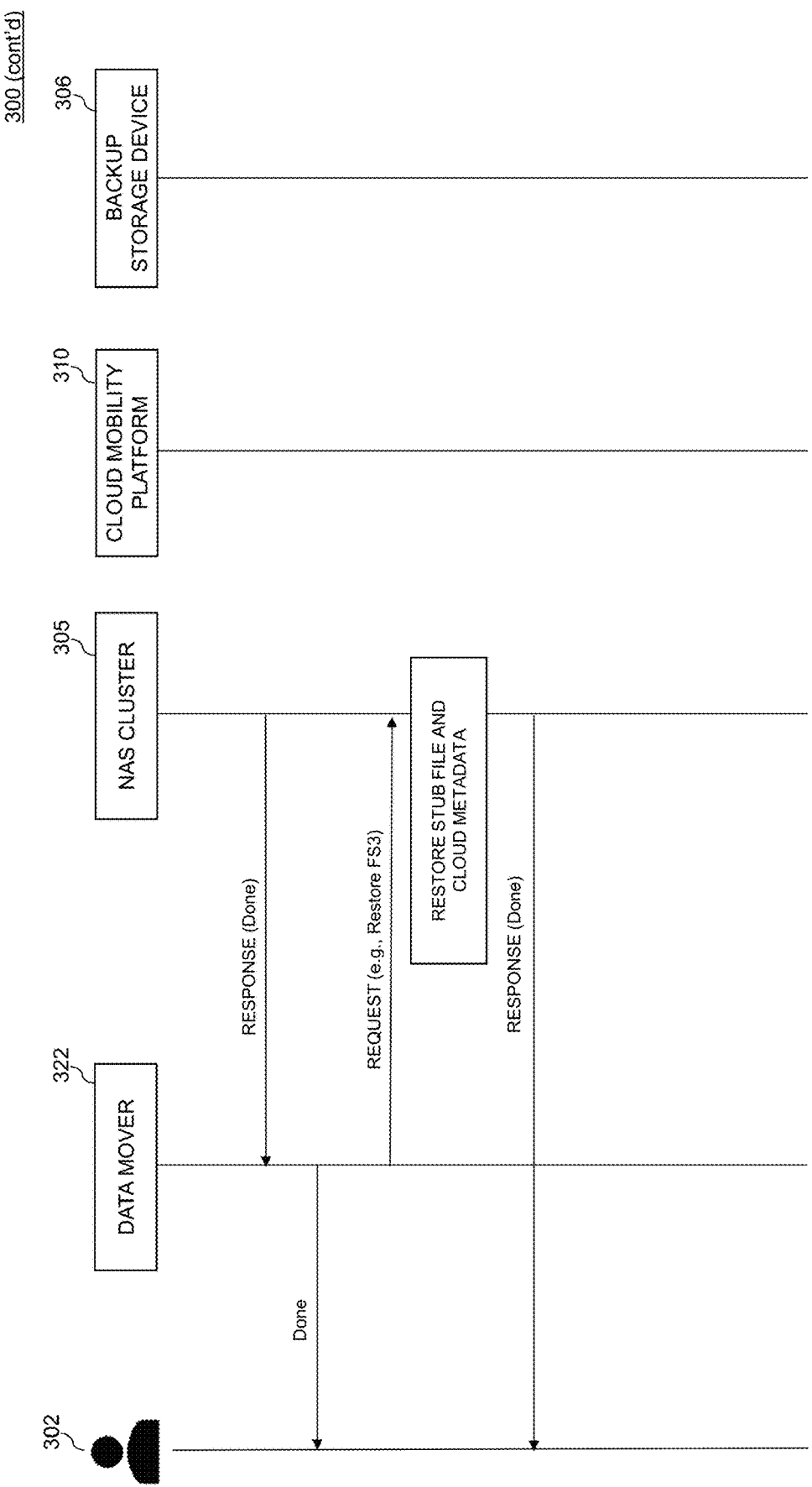
FIG. 3B depicts a second part of an operational flow diagram for data protection illustrating steps for restoring stub files and cloud storage metadata according to an illustrative embodiment.

For example, referring to the information processing system 100 in FIG. 1, the operational flow 200 in FIG. 2, and the operational flow diagram 300 in FIGS. 3A and 3B, a user 302 via, for example, a user device 102, initiates a backup operation to a data mover 322 (which is the same or similar to data mover 122) of a data protection platform (e.g., data protection platform 120) to backup data from a source storage location (e.g., NAS cluster 305) to a backup storage location (e.g., backup storage device 306). It is to be understood that source storage locations can include, for example, a source storage array 105-1, a source storage device 106-1, an NAS storage cluster or device, and/or other type of storage location. Similarly, backup storage locations can include, for example, a backup storage array 105-2, a backup storage device 106-2, an NAS storage cluster or device, and/or other type of storage location. Operations described herein as being performed by or in connection with the data mover 322 may also be performed by or in connection with the data mover 122 of FIGS. 1 and 2. Operations described herein as being performed by or in connection with the NAS cluster 305 may also be performed by or in connection with the source storage array 105-1 of FIG. 1 and the source storage device 106-1 of FIG. 2. Operations described herein as being performed by or in connection with the cloud mobility platform 310 may also be performed by or in connection with the cloud mobility platform 110 of FIGS. 1 and 2. Operations described herein as being performed by or in connection with the backup storage device 306 may also be performed by or in connection with the backup storage array 105-2 of FIG. 1, the backup storage device 106-2 of FIG. 2 or a data domain associated with the data protection platform 120.

As shown in FIG. 2, the user device 102, through a server 121 initiates a backup operation with an INITIATE request to data mover 122. Alternatively, a backup operation may originate from the server 121 as part of a scheduled backup operation. As can be seen in FIG. 2, the data mover 122 sends a MOUNT command to a source storage device 106-1, which makes file systems, files, directories, devices, etc. available to the data mover 122. As can be seen in FIG. 3A, following initiation of a backup operation, and contemporaneously with or following the MOUNT command, the data mover 322 requests a list of file systems from NAS cluster 305, and the NAS cluster 305 returns a list with each file system (FS) (e.g., FS1, FS2 and FS3) in the NAS cluster 305. As used herein a "file system" refers to a structure of files specifying, for example, the manner in which files are named and where they are placed logically for storage and retrieval. File systems may differ between operating systems. A file system stores and organizes data and in accordance with a designated indexing convention, and comprises files, as well as metadata with information identifying the size of the file, location, hierarchy in the directory, etc.

Responsive to receipt of the list of file systems from NAS cluster 305, the data mover 322 requests backup of the file systems. According to illustrative embodiments, the data mover 322 via, for example, a cloud mobility interface (e.g., cloud mobility interface 123) requests from the cloud mobility platform 310, a list of the tiered (or archived) file systems (i.e., an identification of one or more file systems which have been tiered to cloud storage). In response to the request, a microservice(s) component of the cloud mobility platform 310 (or microservice(s) component 111 of cloud mobility platform 110) returns a list of tiered file systems. In this operational example, FS3 is a tiered file system, while FS1 and FS2 are not tiered file systems. As noted herein, a cloud mobility interface of a data protection platform (e.g., cloud mobility interface 123 of data protection platform 120) is configured to connect to the microservice (e.g., microservice(s) component 111) via an API (e.g., REST API). For example, the microservice(s) component 111 includes functionality for determining whether cloud tiering has been enabled on a storage location (e.g., source storage location 105-1), identifying which of the file systems are tiered file systems and returning the list of tiered file systems to the data protection platform 120 (more specifically, to the data mover 122).

As shown in FIG. 3A, the data mover 322 also sends a request (e.g., GET command) to the cloud mobility platform 310 for metadata needed for accessing the tiered file systems from, for example, a cloud storage platform (e.g., one of the cloud storage platforms 130). The metadata (also referred to herein as "cloud metadata") comprises, for example, one or more encryption keys and/or an encryption keystore with encryption keys needed to decrypt encrypted data from the cloud storage platforms 130. The metadata also comprises, for example, one or more file sizes, one or more file names, one or more file locations on the cloud storage platforms 130 and one or more access credentials for one or more file or file systems. For example, file systems may restrict read and write access to a particular group of users, and may require passwords to gain access to the file systems. The metadata can include a list of authorized users and/or passwords for gaining access to the files and/or file system. In some embodiments, the metadata includes access or capability control lists. In one or more embodiments, the metadata comprises configuration parameters of a cloud storage platform 130. Such configuration parameters comprise, for example, hardware and software details for elements of the cloud environment including, but not necessarily limited to, APIs, software for application customization to enable access to the cloud storage platform, operating system information, programming language information, execution environment information, and server and database IP addresses.

In response to the request, a microservice(s) component of the cloud mobility platform 310 (e.g., cloud metadata collection layer 112) retrieves the requested cloud metadata, and sends the cloud metadata to the data mover 322. The data mover 322 writes the metadata to backup storage device 306 or other backup storage location (e.g., backup storage array 105-2, backup storage device 106-2, etc.).

Referring further to FIG. 3A, the data mover 322 also sends a request (e.g., GET command) to the cloud mobility platform 310 for the tiered files (e.g., file1, file2, . . . , filen) of the tiered file system. In response to the request, a microservice(s) component of the cloud mobility platform 310 (e.g., file retrieval layer 113) retrieves a list of the tiered files, and sends the list to the data mover 322. Based on the identified tiered files, the data mover 322 identifies and reads a plurality stub files from the NAS cluster 305 corresponding to the tiered files. The stub files comprise, for example, low capacity (e.g., 8 KB, 10 KB) text files (e.g., file xxx.txt) with information (e.g., metadata) about the destinations in the cloud storage platform 130 so that the tiered files can be retrieved is response to a request for access to the tiered files. The information may comprise, for example, server names or other identifying information (e.g., IP addresses) about the destinations in the cloud storage platform 130 where the tiered files are located. The data mover 322 writes the stub files to backup storage device 306 or other backup storage location (e.g., backup storage array 105-2, backup storage device 106-2, etc.). As shown in FIG. 3A, the process for identifying, reading and backing up stub files is repeated in a loop until all stub files corresponding to the tiered files are read and backed up. The stub files are written to the backup storage device 306 or other backup storage location without writing the tiered files to backup storage device 306 or other backup storage location. As shown in FIG. 3B, once the cloud metadata and stub files are written to the backup storage device 306 or other backup storage location, the data mover 322 receives an indication that the task has been completed, which can be sent a user 302 via, for example, a user device 102.

Additionally, as can be understood from the operational flow 200 in FIG. 2 (e.g., READ and WRITE steps), the data mover 122 reads files which have not been tiered from the source storage device 106-1 and writes the non-tiered files to the backup storage device 106-2. In illustrative embodiments, to determine which files have not been tiered, the data mover 122 is configured to compare file names of files in the source storage device 106-1 with the received list of tiered files to determine which files differ from the files in the list. The data mover 122 then backs up the non-tiered files. In FIG. 2, "Storage Direct Load" refers to the load in connection with backing up data directly from the source storage device 106-1 and to the backup storage device 106-2, "VMs Load" refers to the load in connection with backing up data from VMs and "NAS Load" refers to the load in connection with backing up data from NAS devices, which may include, for example, source storage device 106-1.

As can be understood, in the case of tiered files, the stub files and not the tiered files are written to the backup storage location (e.g., backup storage array 105-2). In addition, the cloud metadata for accessing the cloud storage platforms 130 is also written to the backup storage location (e.g., backup storage array 105-2) to enable restoration of the tiered files as needed. In this way, rehydration is avoided during the backup process, but can be performed in future processes (e.g., in bare metal restore situations) since the backup includes the required cloud metadata if restoration of the entire file needs to be performed. For example, the data mover 122, via the cloud mobility interface 123 and the microservice(s) component 111, uses the cloud metadata from the backup storage array 105-2 to access a given one of the cloud storage platforms 130. Based on the stub files, the restoration layer 114 of the cloud mobility platform 110 rehydrates the tiered files to the backup storage array 105-2 as needed in response to one or more requests for restoration.

Additionally, referring to FIG. 3B, if there is a need to restore a tiered file system (e.g., FS3), and stub files and the cloud metadata are not present in the location where the tiered file system needs to be restored, the stub files and cloud metadata can be restored from a backup location (e.g., backup storage device 306) to the location where the tiered file system needs to be restored (e.g., an NAS cluster or other local storage location) as needed.

In some embodiments, the storage arrays 105 or other storage devices described herein may comprise scale-out all-flash content addressable storage arrays or other type of storage arrays. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cloud mobility platform 110 or the data protection platform 120, the microservice(s) component 111, server 121, data mover 122 and cloud mobility interface 123 in other embodiments can be implemented at least in part externally to the cloud mobility platform 110 or data protection platform 120, for example, as stand-alone servers, sets of servers or other types of systems coupled to the network 104.

The microservice(s) component 111, server 121, data mover 122 and cloud mobility interface 123 in the FIG. 1 embodiment are each assumed to be implemented using at least one processing device. Each such processing device generally comprises at least one processor and an associated memory, and implements one or more functional modules for controlling certain features of the microservice(s) component 111, server 121, data mover 122 and/or cloud mobility interface 123.

At least portions of the cloud mobility platform 110, the data protection platform 120 and the components thereof may be implemented at least in part in the form of software that is stored in memory and executed by a processor. The cloud mobility platform 110, the data protection platform 120 and the components thereof comprise further hardware and software required for running the cloud mobility platform 110 and the data protection platform 120, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the microservice(s) component 111, server 121, data mover 122, cloud mobility interface 123 and other components of the cloud mobility platform 110 and the data protection platform 120 in the present embodiment are shown as part of the cloud mobility platform 110 or the data protection platform 120, at least a portion of the microservice(s) component 111, server 121, data mover 122, cloud mobility interface 123 and other components of the cloud mobility platform 110 or the data protection platform 120 in other embodiments may be implemented on one or more other processing platforms that are accessible to the cloud mobility platform 110 or the data protection platform 120 over one or more networks. Such components can each be implemented at least in part within another system element or at least in part utilizing one or more stand-alone components coupled to the network 104.

It is assumed that the cloud mobility platform 110 and the data protection platform 120 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the microservice(s) component 111, server 121, data mover 122, cloud mobility interface 123 and other components of the cloud mobility platform 110 or the data protection platform 120, and the elements thereof can each be implemented in the form of one or more LXCs running on one or more VMs. Other arrangements of one or more processing devices of a processing platform can be used to implement the microservice(s) component 111, server 121, data mover 122 and cloud mobility interface 123, as well as other components of the cloud mobility platform 110 or the data protection platform 120. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the cloud mobility platform 110 or the data protection platform 120 to reside in different data centers. Numerous other distributed implementations of the cloud mobility platform 110 and the data protection platform 120 are possible.

Accordingly, one or each of the microservice(s) component 111, server 121, data mover 122, cloud mobility interface 123 and other components of the cloud mobility platform 110 or the data protection platform 120 can each be implemented in a distributed manner so as to comprise a plurality of distributed components implemented on respective ones of a plurality of compute nodes of the cloud mobility platform 110 or the data protection platform 120.

It is to be appreciated that these and other features of illustrative embodiments are presented by way of example only, and should not be construed as limiting in any way.

Accordingly, different numbers, types and arrangements of system components such as t the microservice(s) component 111, server 121, data mover 122, cloud mobility interface 123 and other components of the cloud mobility platform 110 or the data protection platform 120, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the cloud mobility platform can be offered to cloud infrastructure customers or other users as part of FaaS, CaaS and/or PaaS offerings.

Figure 4:
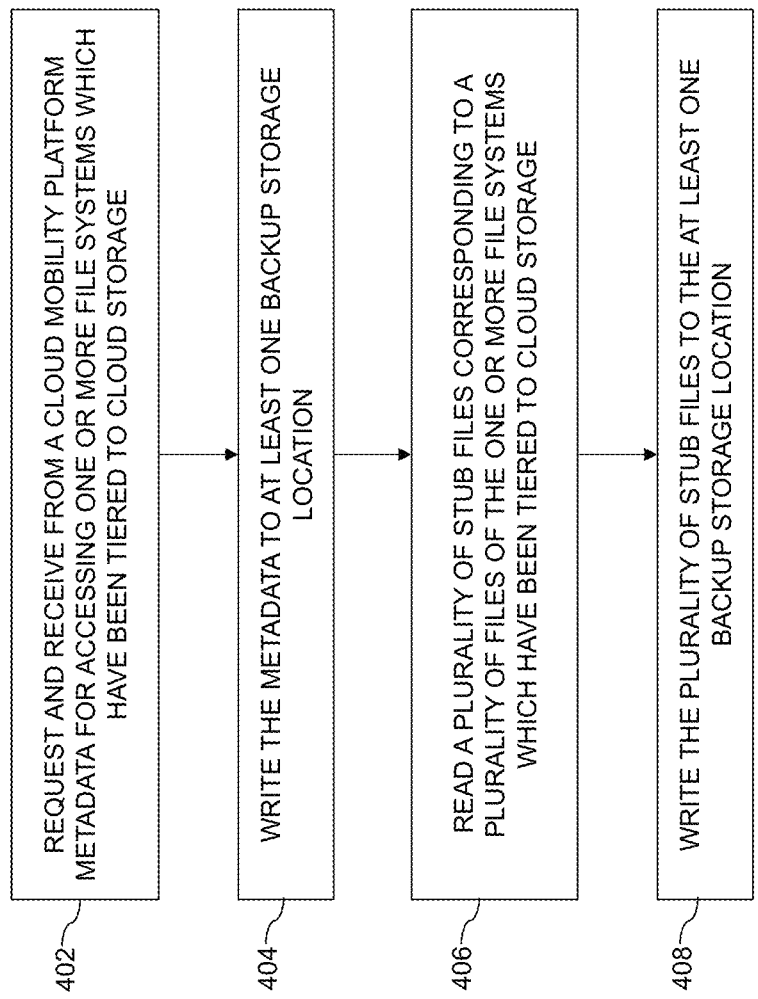
FIG. 4 depicts a process for implementing identification and backing up of stub files and cloud storage metadata according to an illustrative embodiment.

The operation of the information processing system 100 will now be described in further detail with reference to the flow diagram of FIG. 4. With reference to FIG. 4, a process 400 for implementing identification and backing up of stub files and cloud storage metadata as shown includes steps 402 through 408, and is suitable for use in the system 100 but is more generally applicable to other types of information processing systems configured for implementing identification and backing up of stub files and cloud storage metadata.

In step 402, metadata for accessing one or more file systems which have been tiered to cloud storage (e.g., a cloud storage platform) is requested and received from a cloud mobility platform. An identification of the one or more file systems which have been tiered to cloud storage is also requested and received from the cloud mobility platform. In step 404, the metadata is written to at least one backup storage location.

In step 406, a plurality of stub files are read. In one or more embodiments, the plurality of stub files are read from an NAS location. The plurality of stub files correspond to a plurality of files of the one or more file systems which have been tiered to cloud storage. An identification of the plurality of files is also requested and received from the cloud mobility platform. The plurality of stub files are identified based, at least in part, on the identification of the plurality of files.

In step 408, the plurality of stub files are written to the at least one backup storage location. The plurality of stub files are written to the at least one backup storage location without writing the plurality of files of the one or more file systems which have been tiered to cloud storage. In illustrative embodiments, the metadata and/or the plurality of stub files are restored from the at least one backup storage location to another storage location.

In illustrative embodiments, a data protection platform makes a connection with at least one microservice of the cloud mobility platform, wherein the at least one microservice is configured to respond to the request for the identification of the one or more file systems which have been tiered to cloud storage. The at least one microservice is further configured to respond to the request for the metadata. In illustrative embodiments, the connection with the at least one microservice of the cloud mobility platform is via a REST API.

The metadata comprises at least one of one or more file sizes, one or more file names, one or more file locations on a cloud storage platform and one or more user access credentials for one or more files. The metadata further comprises one or more configuration parameters of a cloud storage platform.

It is to be appreciated that the FIG. 4 process and other features and functionality described above can be adapted for use with other types of information systems configured to execute identification and backing up of stub files and cloud storage metadata.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cloud mobility platform and data protection platform as disclosed herein can provide a number of significant advantages relative to conventional arrangements. For example, unlike conventional techniques, the embodiments advantageously preserve NAS space by not rehydrating files during backup procedures. When backing up storage arrays, technical problems exist with detection of stub files, and how to handle backing up of tiered data corresponding to the stub files. For example, stub files are difficult to detect due to differences between storage arrays with respect to stub file generation. Also, due to the rehydration of large amounts of data, backing up the tiered files corresponding to the stub files undesirably causes high bandwidth charges, storage space issues and lack of time to complete backup operations.

The embodiments advantageously provide techniques where data protection software can connect to a cloud mobility endpoint microservice that identifies tiered files and retrieves cloud storage metadata for accessing the tiered files. As a result, stub files are able to be backed up without rehydration of the corresponding archived files from cloud storage. Furthermore, since the cloud metadata, including details like encryption keys, cloud configuration information and access credentials are also backed up, rehydration can be performed in future processes as needed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the cloud mobility platform 110, data protection platform 120 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system, a cloud mobility platform and data protection platform in illustrative embodiments. These and other cloud-based systems in illustrative embodiments can include object stores.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
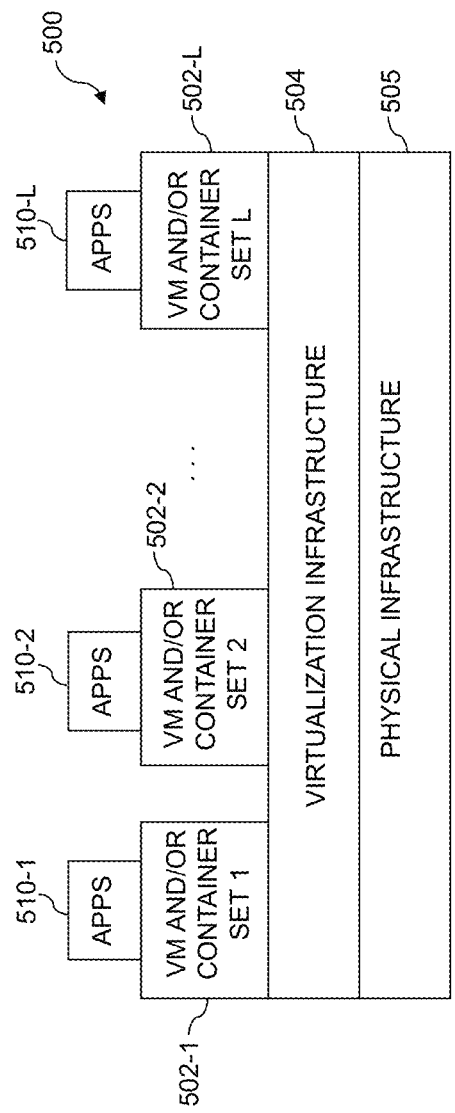
FIGS. 5 and 6 show examples of processing platforms that may be utilized to implement at least a portion of an information processing system according to illustrative embodiments.
Figure 6:
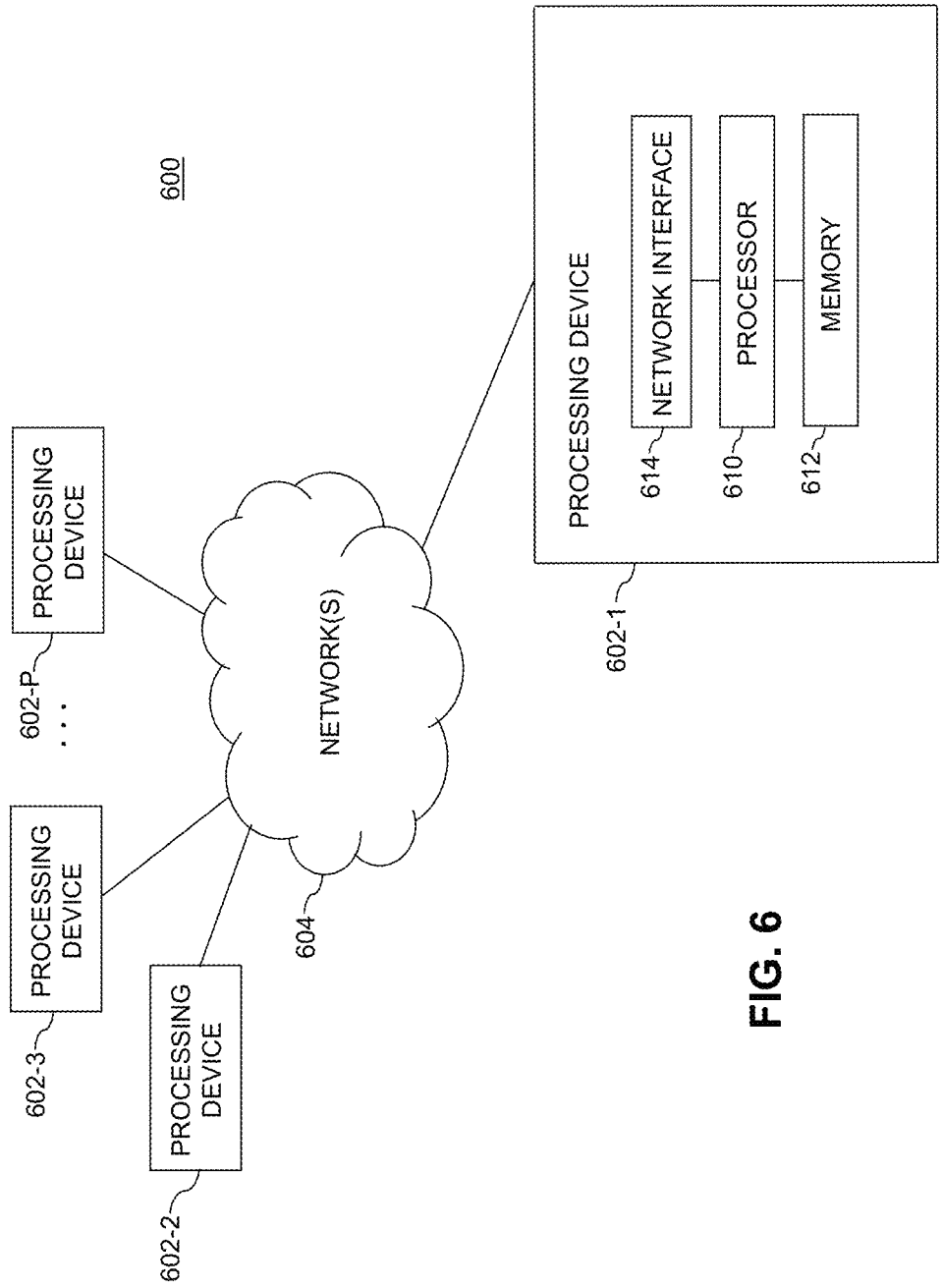

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-P, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the cloud mobility platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cloud mobility platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured:
   to request and receive from a cloud mobility platform metadata for accessing one or more file systems which have been tiered to cloud storage;
   to write the metadata to at least one backup storage location;
   to read a plurality of stub files corresponding to a plurality of files of the one or more file systems which have been tiered to cloud storage; and
   to write the plurality of stub files to the at least one backup storage location.

2. The apparatus of claim 1 wherein said at least one processing platform is further configured to request and receive from the cloud mobility platform an identification of the one or more file systems which have been tiered to cloud storage.

3. The apparatus of claim 2 wherein said at least one processing platform is further configured to connect with at least one microservice of the cloud mobility platform, and wherein the at least one microservice is configured to respond to the request for the identification of the one or more file systems which have been tiered to cloud storage.

4. The apparatus of claim 1 wherein said at least one processing platform is further configured to request and receive from the cloud mobility platform an identification of the plurality of files of the one or more file systems which have been tiered to cloud storage.

5. The apparatus of claim 4 wherein said at least one processing platform is further configured to identify the plurality of stub files based, at least in part, on the identification of the plurality of files.

6. The apparatus of claim 1 wherein said at least one processing platform is configured to read the plurality of stub files from a network attached storage location.

7. The apparatus of claim 1 wherein said at least one processing platform is further configured to connect with at least one microservice of the cloud mobility platform, and wherein the at least one microservice is configured to respond to the request for the metadata.

8. The apparatus of claim 7 wherein said at least one processing platform is configured to connect with the at least one microservice of the cloud mobility platform via a representational state transfer application programming interface.

9. The apparatus of claim 1 wherein said at least one processing platform is configured to write to the at least one backup storage location the plurality of stub files without writing the plurality of files of the one or more file systems which have been tiered to cloud storage.

10. The apparatus of claim 1 wherein the metadata comprises one or more encryption keys.

11. The apparatus of claim 1 wherein the metadata comprises at least one of one or more file sizes, one or more file names, one or more file locations on a cloud storage platform and one or more user access credentials for one or more files.

12. The apparatus of claim 1 wherein the metadata comprises one or more configuration parameters of a cloud storage platform.

13. The apparatus of claim 1 wherein said at least one processing platform is further configured to restore the metadata from the at least one backup storage location to another storage location.

14. The apparatus of claim 1 wherein said at least one processing platform is further configured to restore the plurality of stub files from the at least one backup storage location to another storage location.

15. A method comprising:
requesting and receiving from a cloud mobility platform metadata for accessing one or more file systems which have been tiered to cloud storage;
writing the metadata to at least one backup storage location;
reading a plurality of stub files corresponding to a plurality of files of the one or more file systems which have been tiered to cloud storage; and
writing the plurality of stub files to the at least one backup storage location;
wherein the method is performed by at least one processing platform comprising at least one processing device comprising a processor coupled to a memory.

16. The method of claim 15 further comprising requesting and receiving from the cloud mobility platform an identification of the one or more file systems which have been tiered to cloud storage.

17. The method of claim 16 further comprising connecting with at least one microservice of the cloud mobility platform, wherein the at least one microservice is configured to respond to the request for the identification of the one or more file systems which have been tiered to cloud storage.

18. A computer program product comprising a non-transitory processor-readable storage medium having stored therein program code of one or more software programs, wherein the program code when executed by at least one processing platform causes the at least one processing platform:
to request and receive from a cloud mobility platform metadata for accessing one or more file systems which have been tiered to cloud storage;
to write the metadata to at least one backup storage location;
to read a plurality of stub files corresponding to a plurality of files of the one or more file systems which have been tiered to cloud storage; and
to write the plurality of stub files to the at least one backup storage location.

19. The computer program product according to claim 18 wherein the program code further causes the at least one processing platform to request and receive from the cloud mobility platform an identification of the one or more file systems which have been tiered to cloud storage.

20. The computer program product according to claim 19 wherein the program code further causes the at least one processing platform to connect with at least one microservice of the cloud mobility platform, and wherein the at least one microservice is configured to respond to the request for the identification of the one or more file systems which have been tiered to cloud storage.

* * * * *